United States Patent [19]

Astill

[11] Patent Number: 4,688,601
[45] Date of Patent: Aug. 25, 1987

[54] CONTROL VALVE

[76] Inventor: Cyril J. Astill, 3561 Richmond Road, Victoria, British Columbia, Canada, V8P 4P9

[21] Appl. No.: 853,711

[22] Filed: Apr. 18, 1986

Related U.S. Application Data

[63] Continuation-in-part of Ser. No. 642,561, Aug. 20, 1984, abandoned.

[51] Int. Cl.⁴ ............................................. F16K 11/044
[52] U.S. Cl. .................................. 137/625.5; 251/118; 251/265; 251/335.3; 251/355; 137/238
[58] Field of Search ............ 251/118, 229, 265, 335 B, 251/355; 137/625.5, 238

[56] References Cited

U.S. PATENT DOCUMENTS

| | | | |
|---|---|---|---|
| 633,217 | 9/1899 | Qurin | 251/265 |
| 1,203,371 | 10/1916 | Lowe | 251/265 |
| 1,298,173 | 3/1919 | Cadman | 251/166 |
| 1,547,962 | 7/1925 | Seewer | 251/118 X |
| 2,252,923 | 8/1941 | Granetz | 251/264 X |
| 2,356,748 | 8/1944 | Boynton | 251/355 X |
| 2,750,961 | 6/1956 | Uritis | 137/625.5 |
| 3,157,831 | 11/1964 | Ray | 251/355 X |
| 3,194,264 | 7/1965 | Greco | 137/556 |
| 3,428,291 | 2/1969 | Callahan, Jr. et al. | 251/122 |
| 3,550,903 | 12/1970 | Hauser | 251/158 |

*Primary Examiner*—Samuel Scott
*Assistant Examiner*—Allen J. Flanigan

*Attorney, Agent, or Firm*—R. William Wray & Associates

[57] ABSTRACT

A plug or poppet valve is positioned in relation to an opening for controlling flow through the opening, with a flange positioned over the side opening and having a portion extending into the interior of the housing towards the plug or poppet, said flange and its extended portion having a circular cross-section opening therethrough, said opening having an interior pre-determined pitch thread over a lower portion of its length. There is also provided a primary valve stem rotatably mounted in the circular cross-section opening and having an exterior thread adapted to co-act with said interior thread, said valve stem having a concentric circular opening in its lower portion containing an interior predetermined pitch thread and having an upper portion adapted to be connected to a valve drive system, a secondary valve stem rotatably mounted in the concentric circular opening and having an exterior thread over its upper end adapted to co-act with the interior thread in the circular opening in the primary valve stem and having a lower section connected to the valve closure mechanism, and a cylindrical metal bellows sealably connected at its upper end to the said flange and at its lower end to the lower end of the secondary valve stem such as to isolate liquid flow in the interior of the valve from the valve stems, said bellows being of a length to allow movement of the primary valve stem from a fully valve closed position to a fully open position.

5 Claims, 7 Drawing Figures

CONTROL VALVE

This application is a Continuation-in-part of application Ser. No. 642,561 filed Aug. 20, 1984, now abandoned.

The invention relates to a globe-type control valve and more particularly to a valve operable by a micro-adjustable actuator.

BACKGROUND OF THE INVENTION

In fluid systems there is a need for accurate and reliable valves to control flow and balance system loads. This need exists in all types of systems for low pressure and flow, domestic, general, commercial, industrial and high pressure systems more particularly in industrial chemical and nuclear applications.

In the present state of the art, electro-mechanical, hydraulic or pneumatic actuators are cumbersome, frequently unreliable over the complete open-to closed range, and fail to provide a repeatably accurate positioning of the plug and rapid response to calls for flow variations.

Presently available flow control valves have packed stems which require a build-up of force (normally provided by solenoid, or pneumatic actuators) in order to overcome packing friction on the valve stem which leads to sluggish response and jerking motion of the valve plug. In the case of solenoid or pneumatic operators, the plug is snapped closed by fluid flow when the actuator brings the plug toward the closed position.

In the case of large control valves in high pressure applications, the large material mass of a valve bonnet and actuator offset in many cases several feet from the center line of the pipe is of grave concern to the design engineer who must provide for suitable hangers and snubbers to stabilize the non-symmetric mass in the event of severe earthquake activity. This concern is doubly important in the design of chemical and nuclear stations.

Bellows sealed control valves are not widely used because of the necessity to provide bonnet containment of a very long bellows to provide reasonable life expectancy in view of the frequent motion of a control valve stem.

A control valve design which provides for rapid response and a plug actuator capable of a smooth, even motion is not presently available.

DISCLOSURE OF THE INVENTION

It is an object of the present invention to provide a control valve in which the position of the plug is micrometer controlled throughout the whole of its axial stroke, i.e. it cannot snap closed even when pressure builds behind it while it is only allowing a trickle flow.

It is a further object of the invention to provide a control valve that is leak-proof to the exterior over its complete operating range. It is a further object of the invention to provide a valve containing mechanism built into the valve stem.

It is a further object of the invention to provide a valve having a high ratio jacking capability which can overcome back pressure on a large diameter plug when opening the valve from a fully closed position.

It is a further object of the invention to provide a control valve that requires only a relatively short bonnet and small actuator.

These and other objects of the invention are achieved by a globe-type control valve for precisely controlling the flow of a liquid in a pipe comprising:
- (a) a bulbous valve housing having liquid inlet and outlet port openings and a side opening,
- (b) a wall structure across the housing having an opening for passage of liquid from the inlet opening to the outlet opening,
- (c) a valve closure mechanism in the form of a large diameter plug or poppet working in relation to a valve seat formed in the wall structure such as to provide control of the annular flow between the plug and the valve seat, the diameter of said poppet or plug being greater than the inside diameter of the inlet or outlet port openings.
- (d) a flange positioned over the side opening and having a portion extending into the interior of the housing towards the plug or poppet, said flange and its extended portion having a circular cross-section opening therethrough, said opening having an interior pre-determined pitch thread over a lower portion of its length,
- (e) a primary valve stem rotatably mounted in the circular cross-section opening and having an exterior thread adapted to co-act with said interior thread, said valve stem having a concentric circular opening in its lower portion containing an interior predetermined pitch thread and having an upper portion adapted to be connected to a valve drive system.
- (f) a secondary valve stem rotatably mounted in the concentric circular opening and having an exterior thread over its upper end adapted to co-act with the interior thread in the circular opening in the primary valve stem and having a lower section connected to the plug or poppet,
- (g) a cylindrical metal bellows positioned over the primary and secondary valve stems and sealably connected at its upper end to the said flange and at its lower end to the lower end of the secondary valve stem such as to isolate liquid flow in the interior of the valve from the valve stems, said bellows being of a length to allow movement of the secondary valve stem from a fully valve closed position to a fully open position.
- (h) said pre-determined pitch threads on the valve stems being chosen such as to give an increased mechanical advantage, micrometer movement to the secondary valve stem on rotation of the primary valve stem.

BRIEF DESCRIPTION OF THE DRAWINGS

In drawings which illustrate embodiments of the invention.

DESCRIPTION OF EMBODIMENTS OF THE INVENTION

Figure 1:
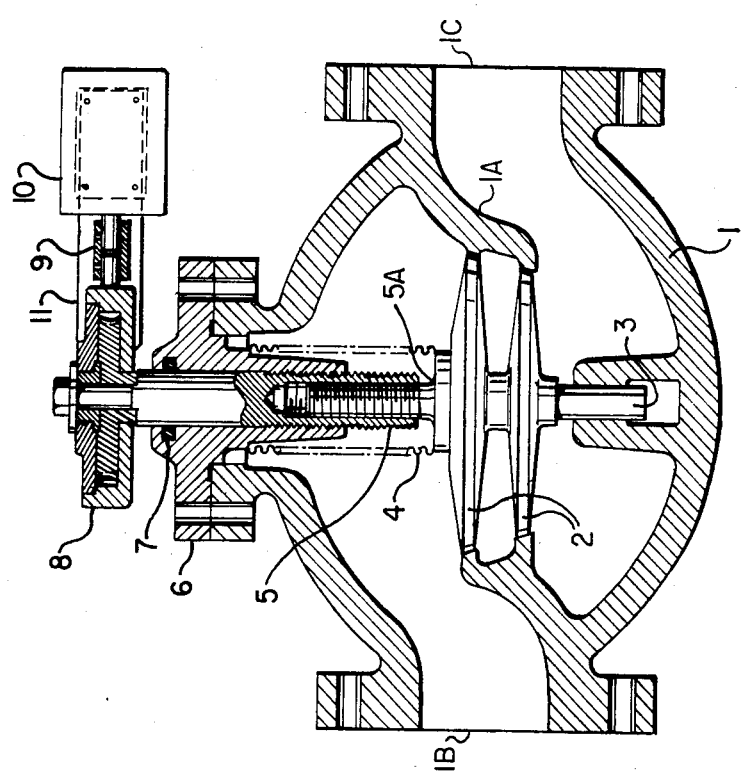
FIG. 1 is a cross-section of a double plug version of the control valve.

Referring to the drawings, FIG. 1 shows a valve housing 1 incorporating a wall structure 1A and in which a double plug 2 has a square or suitably splined or keyed section 3 which pilots the seating rings of the plug into matching seats formed in wall structure 1A and also prevents torque being applied to a metal bellows 4 which is welded to the upper face of the plug at one end and to the sleeve housing flange 6 at the other. When the flange 6 is clamped to the valve housing 1 and sealed with a suitable gasket the fluid containment envelope is complete. The diameter of the plugs are greater than the inside diameter of the input and output port openings 1B and 1C.

A primary valve stem 5 has an internal for example, 16 threads per inch hole into which is screwed a secondary valve stem 5A which is connected to the double plug or poppet 2.

The lower part of the outside diameter of the primary valve stem 5 is threaded with, for example, 12 threads per inch and is screwed into a threaded inwardly extended portion of flange 6. In actual construction these parts would be pre-assembled before the bellows is welded to the plug and after it is welded to the flange.

In operation it can be seen that when the flange 6 is fixed to the valve housing 1 and plug 2 is located and prevented from rotating by the spline or other means 3, then rotation of the primary valve stem 5 will produce motion of secondary valve stem 5A and double plugs 2 in either direction equivalent to the difference for example between the two thread pitches, i.e. 12 TPI 0.0833 inches and 16 TPI 0.0625"=0.0208" per revolution of the valve stem 5.

The micro mechanism is therefore contained inside the bellows and can be sealed with packing 7 which would also act as the mandatory back-up seal which is required in nuclear applications to prevent catastrophic leakage in the event of bellows failure. A moisture sensor housed inside the bellows could also be installed to warn of failure.

Figure 2:
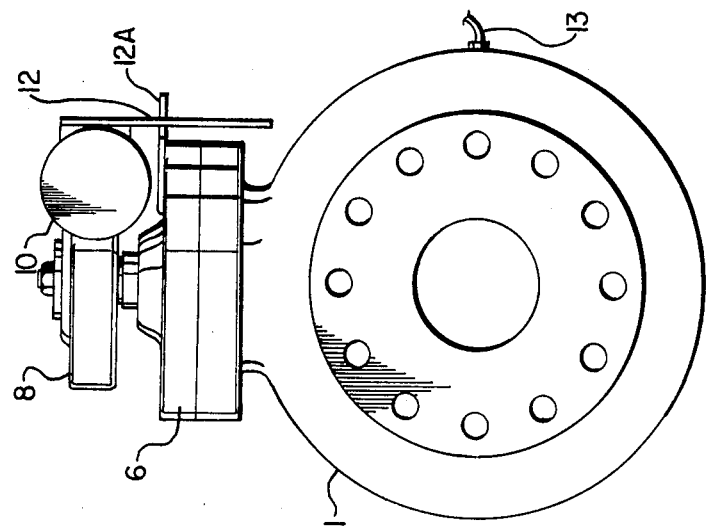
FIG. 2 is an end view of the valve of FIG. 1.

Also shown in FIG. 1 is a, for example, secondary 50:1 worm reduction unit which also further reduces the size of the actuator motor 10 which could be electrical, mechanical, or pneumatic, and is coupled to the drive shaft with a coupling 9 and housed by bracket attachment 11 to the gear box 8. As shown in FIG. 2 an anti-rotation device 12 operating on restraint brackets 12A attached to the valve body restrains the torque generated through the gear box.

The valve body 1 is more bulbous than a conventional control valve body but is basically symmetrical around the center line of the pipe except for penetration of the actuator and a small penetration of the twin plug pressure balancing line 13 which would be used if desired to adjust pressure differentials between valve plug regions.

Figure 3:
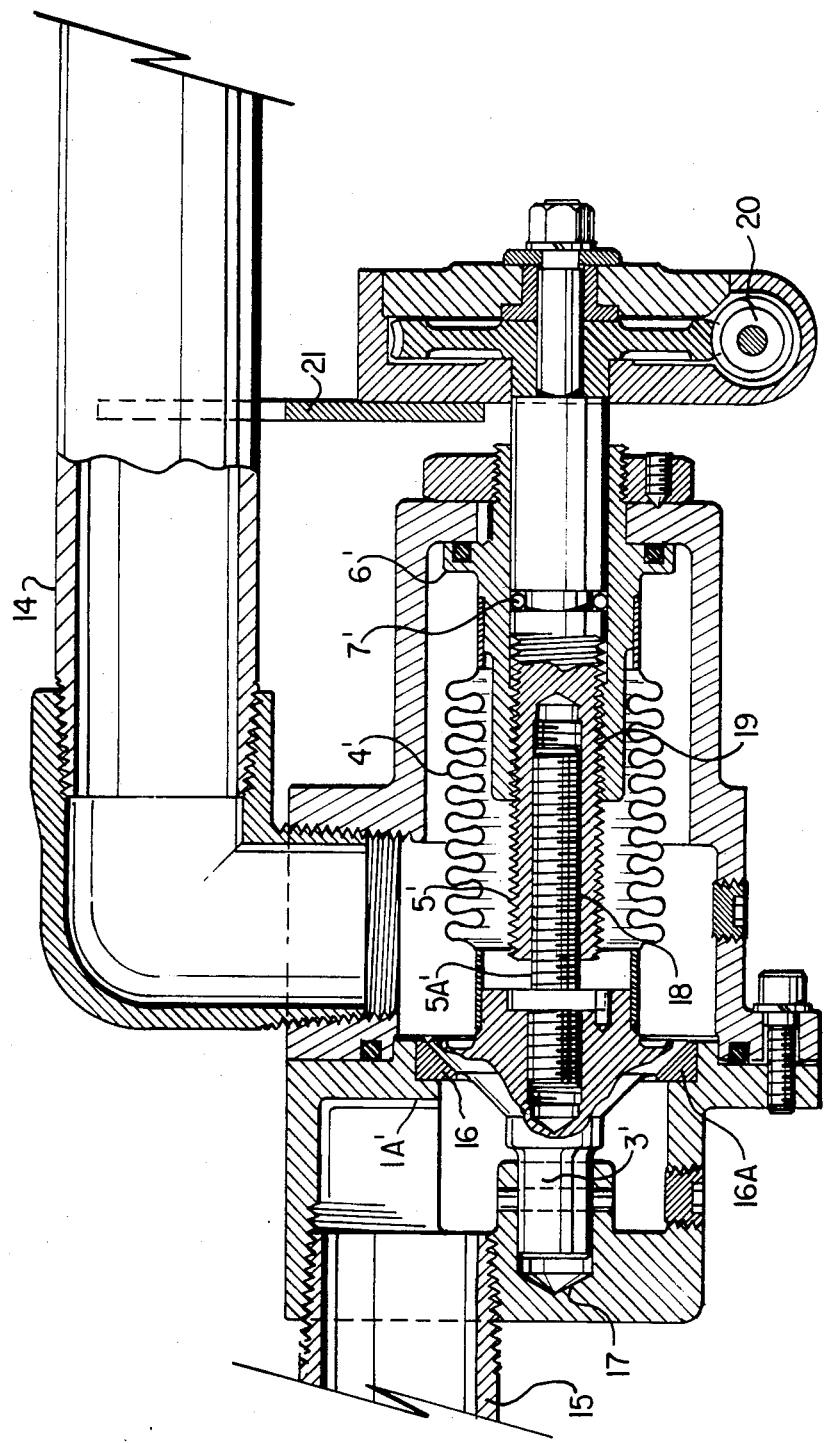
FIG. 3 is a cross-section of a single plug version of a fully designed control valve.

It is also pointed out that except for very high pressure systems, a single plug control valve is easily operated due to the high jacking capability of the micro mechanism. A version of this type of valve is shown in FIG. 3.

In this design the input line 14 and output line 15 are not co-linear but the drive motor and control structure lie parallel to and closely adjacent to the flow lines. This allows a very compact design set-up with no need for a long valve actuating mechanism standing off at right angles to the flow lines. As in FIG. 1, bellows 4 isolates the liquid flow from the micrometer actuating mechanisms giving substantially leak proof operation with stem packing 7 required chiefly for containing lubricating oils inside the micrometer mechanism. Secondary valve stem 5A carries annular valve facing 16 working into valve seat 16A formed or mounted in wall structure 1A' and also splined or keyed sections 3 into a suitable opening 17. This construction provides precision operation of the valve face against the seat but also prevents wear caused by rotation of these against each other, and prevents torque being transmitted to the bellows. To obtain precision flow control the plug must have a large diameter in the range 1½ to 3 times the inner diameter of the input and output lines 14 and 15 and preferably approximately twice as great.

Secondary valve stem 5A is mounted in a screw thread 18 inside primary valve stem 5 which in turn is mounted in a screw thread 19 in the inner portion of flange 6. The primary valve stem is actuated by a drive motor (not shown) driving worm gear mechanism 20. The outside housing of this mechanism is prevented from rotation by arm 21 bearing on pipe 14.

The bellows used should be of high quality and capable of large numbers of recycling actions. A suitable bellows would be of the type produced by the method of U.S. Pat. No. 4,207,453 issued June 10, 1980 to Atomic Energy of Canada Limited, Ottawa, Canada on an invention by the present applicant and U.S. Pat. No. 4,453,304 issued June 12, 1984 to Atomic Energy of Canada Limited, Ottawa, Canada on an invention by the present applicant and Peter Janzen.

Figure 4:
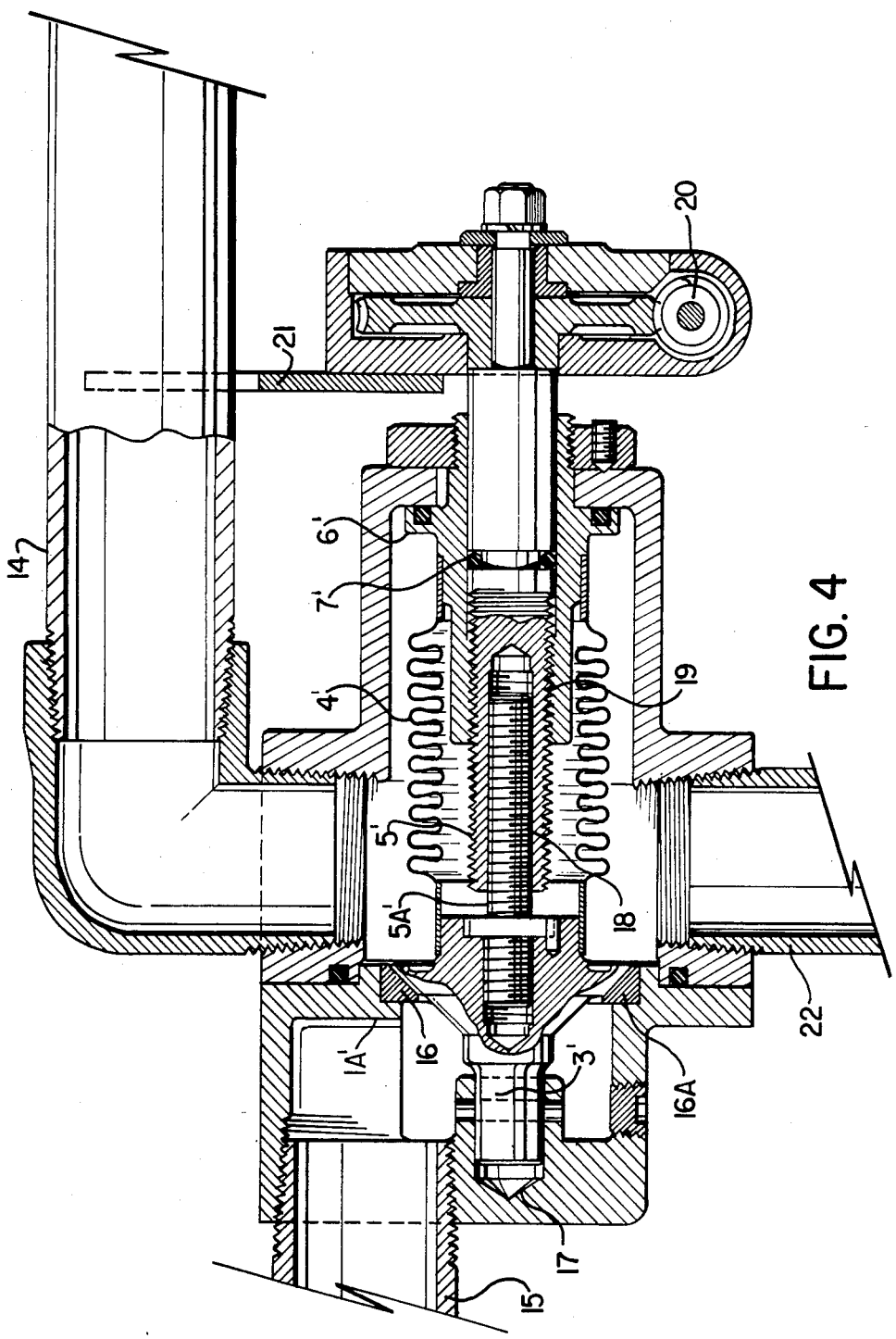
FIG. 4 is a cross-section of the valve used as a flow mixer.

FIG. 4 is similar to FIG. 3 but shows a valve having three input or output lines, 14, 15 and 22. This version can be used as a flow mixer with flow from one line being injected into flow via the other two lines.

Perennial problems associated with valve noise, turbulence and seat erosion have in the past been addressed by numerous ingenious configurations of orifices in the form of sleeve type valves, elongated flow chambers, etc. The globe type valve assembly of the present application, in addition to providing an hermetically sealed, extremely accurate plug positioning capability, provides the mechanical advantage necessary to open or close a much larger than standard plug against system pressures. Only with the larger plug is it practical to introduce flow into the valve body in a path tangential to the center line of the plug.

Figure 5:
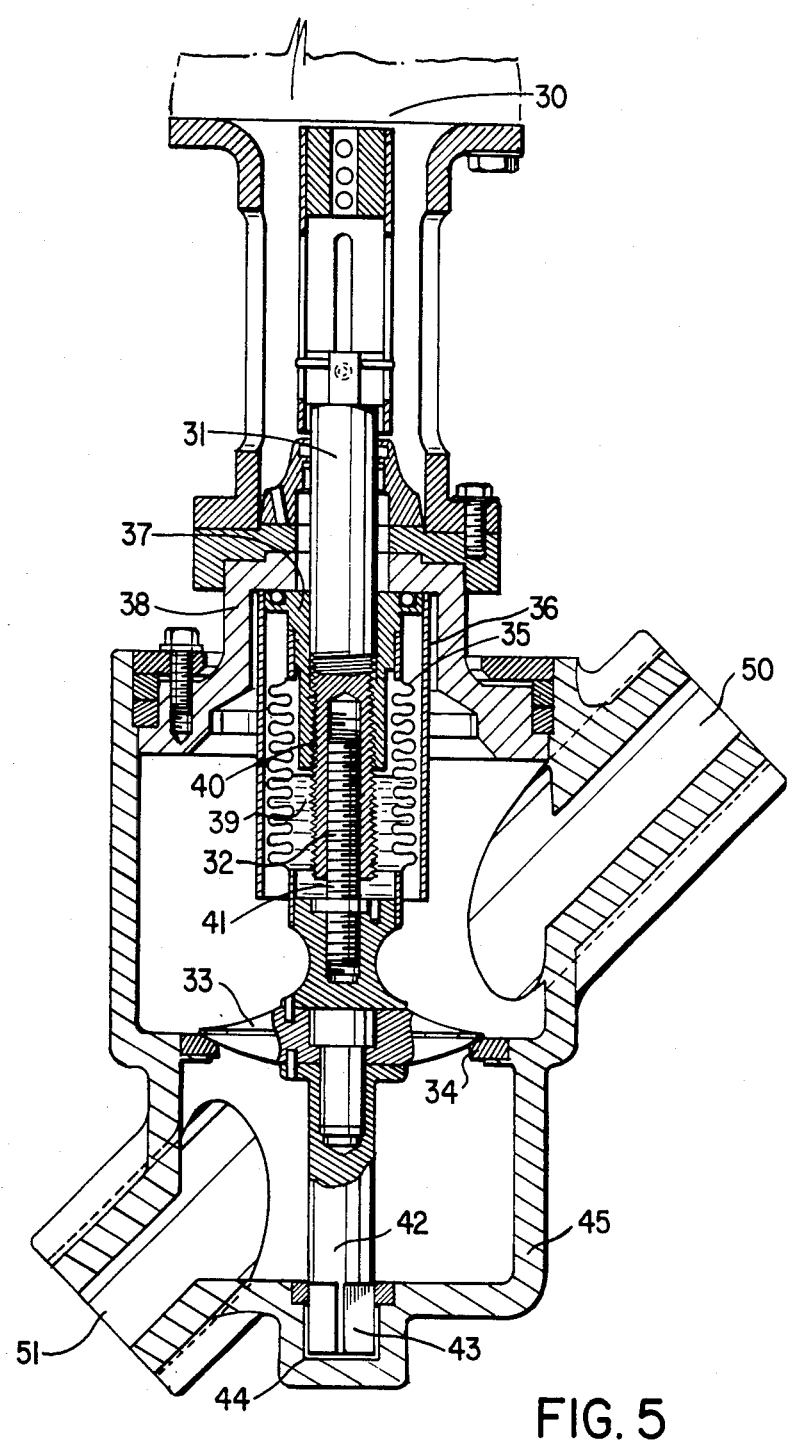
FIG. 5 is a cross-section of an offset and tangential flow version.
Figure 6:
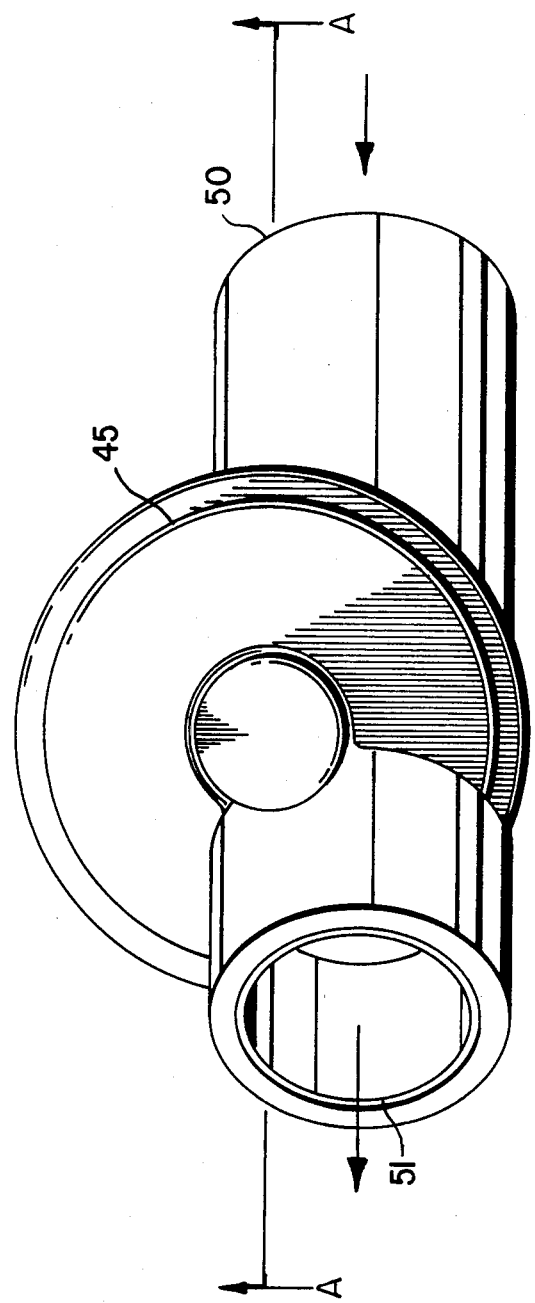
FIG. 6 is a view of the bottom of the valve in FIG. 5.

FIGS. 5 and 6 illustrate a version of this type of configuration. A rotary actuator 30 is connected to a micrometer controllable primary and secondary valve stem system (31 and 32) which operates valve plug 33 working into valve seat 34. Metal bellows 35 which has a bellows protective sleeve 36 is connected to the secondary valve stem 32 and to upper bushing 37 positioned in valve bonnet 38. An oil bath 39 is located inside the bellows and serves to lubricate the screw threads 40, 41 of the primary and secondary valve stems. The bottom end of plug 33 is connected via pilot shaft 42 to a splined or squared shaft section 43 working into opening 44 in valve housing 45. The inlet and outlet lines 50 and 51 are co-linear but enter valve housing 45 at an angle to the plug operating mechanism and offset from the center line. This is shown in FIG. 6 which is a cross-section on line A—A of FIG. 5.

The resulting vortex type flow pattern achieved by this configuration through the large diameter but narrow annular orifice results in substantially reduced noise, turbulence and seat erosion. NOt only is the seat erosion reduced greatly but the smooth high velocity vortex flow through the orifice results in a cleaning action on the seat and plug surfaces.

Figure 7:
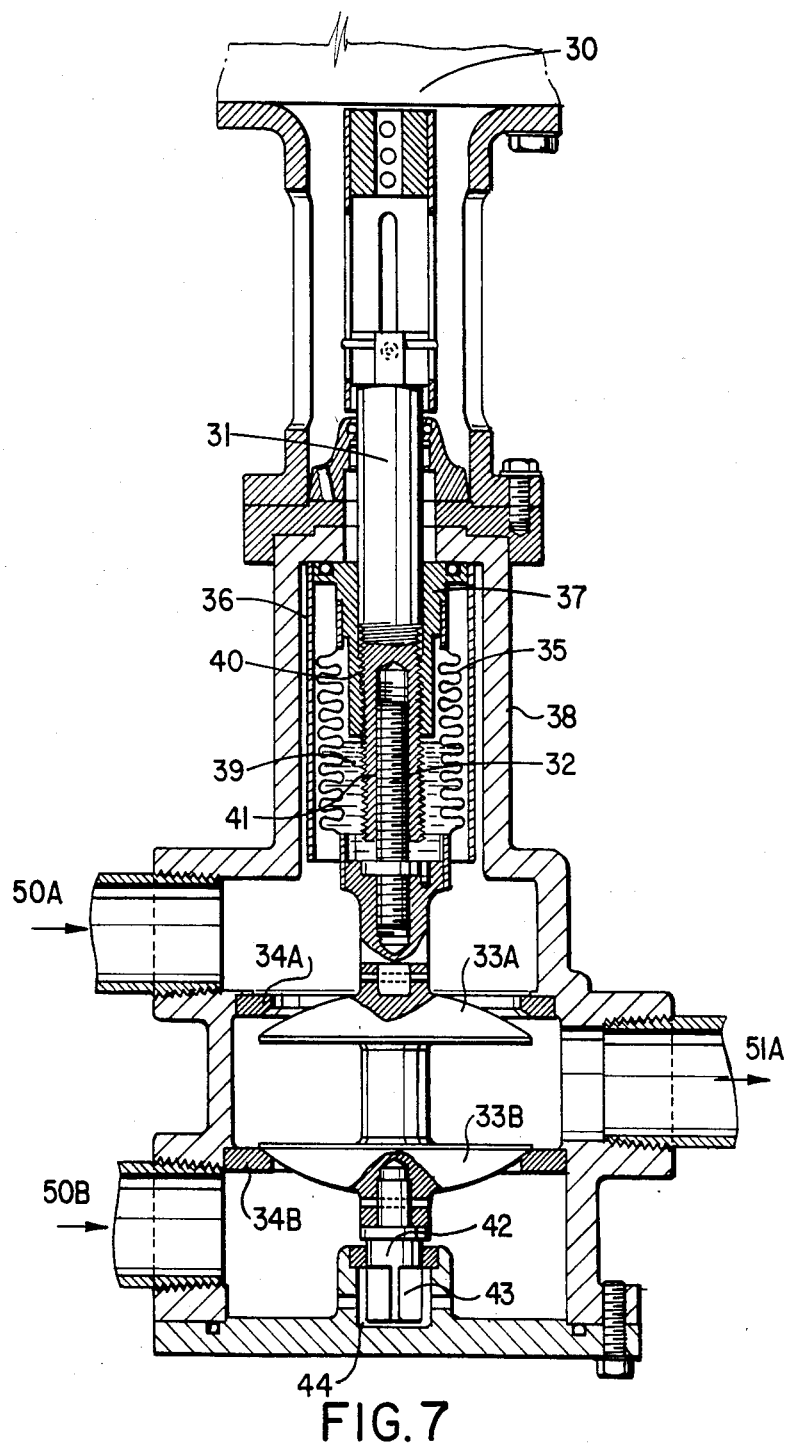
FIG. 7 is a double plug flow mixer.

FIG. 7 is the control valve used as a precisely controllable flow mixer. The valve operating mechanism and the anti-rotation system are similar to that of FIG.

5. A double acting plug arrangement 33A and 34B work in conjunction with valve seats 34A and 34B. Two inlet flow lines 50A and 50B are provided such that the two incoming liquids are controllably mixed in the valve and exit from output line 51A.

This combination of high jacking capability and accurate plug position control by differential threads housed within an oil bath container formed by the bellows which also serves as an hermetic seal for the valve operating stem results in plug assembly which can be located inside the valve body. The short, compact plug assembly is a direct result of the short stroke requirement of the large diameter plug.

Tangential vortex flow through a much larger than normal annular orifice combined with an oil bathed hermetically sealed plug assembly has been found to produce a small, compact control valve design with vastly superior control capabilities to any valve known or commercially available at the present time.

In all of the versions of the invention described above the micro-adjustable and high jacking load capabilities of the actuator mechanism provide absolute control over the movement of the plug or poppet valve closure mechanism even against high back pressures. This is not possible with conventional valve actuators. The closure mechanism can therefore be sized to allow for minimal axial stroke of the valve stem which in turn permits the use of a much shorter bellows and therefore smaller valve bonnet than is normally required in conventional valves.

It will be readily apparent to a person skilled in the art that a number of variations and modifications can be made without departing from the true spirit of the invention which will now be pointed out in the appended claims.

I claim:

1. A control valve for precisely and continuously controlling the flow of a liquid in a pipe comprising:
    (a) a relatively large diameter bulbous valve housing having liquid inlet and outlet port openings and a side opening,
    (b) a wall structure across the housing having an opening for passage of liquid from the inlet port opening to the outlet port opening,
    (c) a valve closure mechanism in the form of a relatively large diameter plug or poppet valve working in relation to a valve seat formed in the wall structure such as to provide precise and continuous control of the annular flow through the opening, the diameter of said plug or poppet being greater than the inside diameter of the inlet and outlet port openings,
    (d) a flange positioned over the side opening and having a portion extending into the interior of the housing towards the valve closure mechanism, said flange having an upper wall containing a circular opening and its extended portion having a circular cross-section opening therethrough, said opening in the extended portion having an interior predetermined pitch thread over a lower portion of its length,
    (e) a primary valve stem rotatably mounted in the circular cross-section opening and having an exterior thread adapted to co-act with said interior thread, said valve stem having a concentric circular opening in its lower portion containing an interior pre-determined pitch thread and having an upper circular cross-section portion passing through the circular opening in the upper wall of the flange and adapted to be connected to a valve drive system,
    (f) an O-ring back-up seal positioned between the circular opening in the upper wall of the flange and the circular cross-section portion of the primary valve stem passing therethrough,
    (g) a secondary valve stem rotatably mounted in the concentric circular opening and having an exterior thread over its upper end adapted to co-act with the interior thread in the circular opening in the primary valve stem and having a lower section connected to the valve closure mechanism,
    (h) a cylindrical metal bellows positioned over the primary and secondary valve stems and sealably connected at its upper end to the said flange and at its lower end to the lower end of the secondary valve stem such as to isolate liquid flow in the interior of the valve from the valve stems, said bellows being of a length to allow movement of the primary valve stem from a fully valve closed position to a fully open position,
    (i) an oil bath contained between said O-ring back-up seal and said bellows such as to lubricate the constantly moving threaded portions of the primary and secondary valve stems.
    (j) said pre-determined pitch threads on the valve stems being chosen such as to give an increased mechanical advantage, micrometer movement to the secondary valve stem on rotation of the primary valve stem, and
    (k) means for preventing rotation of the secondary valve stem in relation to the housing on rotation of the primary valve stem comprising a shaped or splined extension on the valve closure mechanism working into a similarly shaped close ended opening built into the housing wall.

2. A control valve as in claim 1 wherein the diameter of the said plug or poppet is in the range 1½ to 3 times the inside diameter of the inlet and outlet port openings.

3. A control valve as in claim 1 wherein the diameter of said plug or poppet is approximately twice the inside diameter of the inlet and outlet port openings.

4. A control valve as in claim 1 adapted to operate as a controllable mixing valve wherein the wall structure is in the form of first and second wall members having openings for passage of liquid from inlet to outlet port openings, said wall members defining an upper chamber having a first liquid inlet port opening, a lower chamber having a second liquid inlet port opening, and a central chamber having a mixed liquid outlet port opening and the valve closure mechanism is in the form of first and second plugs working in relation to valve seats formed in the first and second wall members and positioned to operate in opposing valve opening and closure sense to each other such that the ratio of the volumes of the two incoming liquids can be varied by operation of the valve drive system.

5. A control valve as in claim 1 wherein the said liquid inlet and outlet port openings are positioned in the walls of the housing with their center-lines offset from and tangentially to the valve plug center-line such that a vortex flow is produced in the incoming liquid as it passes into the valve and through the annular opening between plug and valve seat.

* * * * *